United States Patent [19]

Lawther

[11] Patent Number: 4,896,180
[45] Date of Patent: Jan. 23, 1990

[54] FILM INITIALIZATION REASSURING MECHANISM

[75] Inventor: Joel S. Lawther, Rochester, N.Y.

[73] Assignee: Eastman Kodak Company, Rochester, N.Y.

[21] Appl. No.: 363,556

[22] Filed: Jun. 8, 1989

[51] Int. Cl.$^4$ .............................................. G03B 17/36
[52] U.S. Cl. .................................................. 354/217
[58] Field of Search .................... 354/215, 217, 218

[56] References Cited

U.S. PATENT DOCUMENTS

| | | | |
|---|---|---|---|
| 3,688,668 | 9/1972 | Ort | 354/215 X |
| 4,134,657 | 1/1979 | Nomura | 354/215 X |
| 4,334,753 | 6/1982 | Harvey | 354/212 X |
| 4,340,291 | 7/1982 | Berg | 354/215 |
| 4,432,628 | 2/1984 | Sakurda et al. | 354/217 X |
| 4,492,446 | 1/1985 | Zawodny et al. | 354/215 |
| 4,707,096 | 11/1987 | Lawther | 354/217 X |

Primary Examiner—Michael L. Gellner
Assistant Examiner—Brian W. Brown
Attorney, Agent, or Firm—Roger A. Fields

[57] ABSTRACT

When an unexposed filmstrip is advanced several frame widths in a camera to position the first available frame for exposure, a frame counter is changed from an original empty setting to a "1" setting. According to the invention, a visible indication is provided in response to the frame counter being changed to its "1" setting which confirms that the first frame is positioned for exposure. This is done to reassure the photographer that proper film winding and film initialization have occurred.

9 Claims, 4 Drawing Sheets

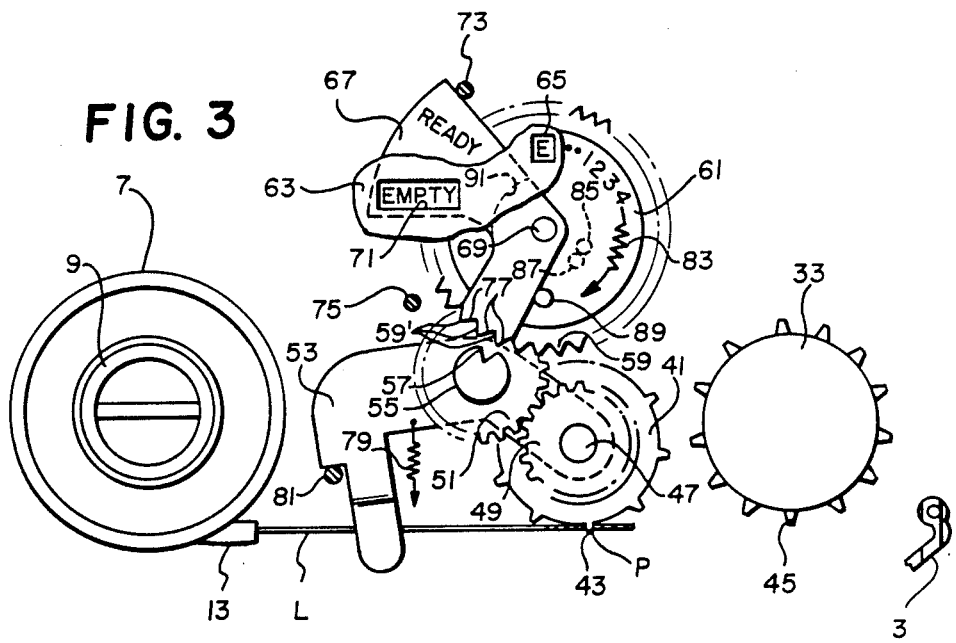
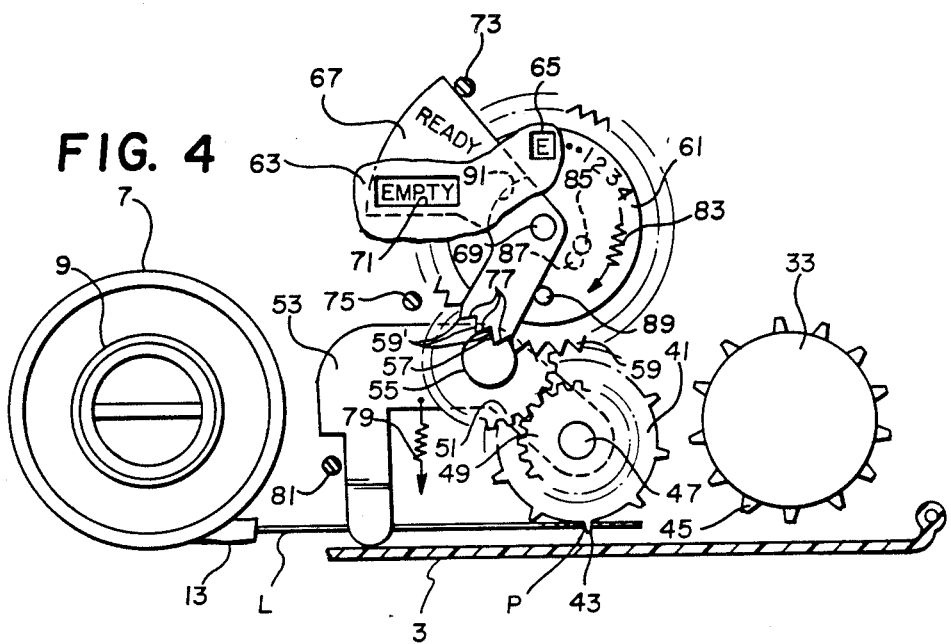

FILM INITIALIZATION REASSURING MECHANISM

BACKGROUND OF THE INVENTION

1. Field of the Invention

The invention relates generally to the field of photographic cameras. More particularly, the invention relates to a still-picture camera which, when loaded with a light-tight cartridge containing an unexposed filmstrip, will alert the user that the filmstrip has been initialized, i.e. advanced to position its first available frame for exposure.

2. Description of the Prior Art

To load most 35mm cameras, the film cartridge is inserted in a loading chamber of the camera and the forward end portion of a film leader projecting from a light-trapping slit in the cartridge is placed over a film take-up spool in a take-up chamber of the camera. In many cameras, the forward end portion of the film leader is manually attached to the take-up spool before a rear door of the camera is closed. Then, an initial film winding operation is performed, for example by pivoting a winding lever and depressing a shutter release button several times until the entire leader is wound onto the take-up spool and the first available frame of the filmstrip is positioned for exposure. In other cameras, the forward end portion of the film leader is automatically secured to the take-up spool at the beginning of the film winding operation. As the take-up spool is rotated, one or more circumferential teeth of the spool engage the forward end portion of the film leader at its perforations to wind the leader onto the spool and to position the first available frame of the filmstrip for exposure. A spring-like deflector or other suitable means may be provided on the rear door of the camera for pressing the film leader against the take-up spool to facilitate engagement of the forward end portion of the leader by the teeth of the spool. After the first frame of the filmstrip is exposed, subsequent exposures are made by repeating the film winding and shutter releasing operation.

Each time a film frame is positioned for exposure, a frame counter in the camera is incremented to provide a frame number indication corresponding to the number of the positioned frame. A problem that sometimes exists, however, is that it may be difficult for the photographer to tell when the first available frame is positioned for exposure. Typically, the frame counter has an original empty indication and a first frame number indication which are separated by a series of two spaced dot-like or other indications. The frame counter is incremented three times to change from its original empty indication to its first frame number indication. This is in conformity with the requirement that the filmstrip must be advanced approximately three frame widths to wind the film leader onto the take-up spool and to position the first available frame for exposure. A window in the camera for successively observing the original empty indication, the dot-like indications, and the first frame number indication is usually wide enough to permit the first frame number indication to at least partially enter the window after the filmstrip is advanced only two of the three frame widths. Thus, there is the possibility that the photographer seeing the first frame number indication in the window may attempt to take a picture before the first available frame is positioned for exposure.

Commonly assigned U.S. Pat. No. 4,707,096, issued Nov. 17, 1987, eliminates the foregoing prior art problem by providing a film initialization confirming mechanism in the camera which reassures the photographer that the first available frame is positioned for exposure.

SUMMARY OF THE INVENTION

According to the invention, there is provided a film initialization confirming mechanism that is mechanically simpler, and therefore less costly to manufacture, than the one disclosed in commonly assigned U.S. Pat. No. 4,707,096.

In particular, there is provided an improved photographic camera wherein (a) a frame counter is adapted to be changed to successive numbered settings corresponding to respective frames of a filmstrip, (b) a motion-transmitting element completes a cycle of movement each time the next available frame is positioned for exposure, to change the frame counter to a new numbered setting corresponding to that frame, and (c) a film confirmation indicator is changed to a ready setting substantially simultaneously with the motion-transmitting member changing the frame counter to a first numbered setting corresponding to the first available frame to be positioned for exposure, to provide a reassuring indication that the camera is ready to take a picture, and wherein the improvement comprises:

said motion-transmitting element and said film confirmation indicator include respective cooperating means for changing the film confirmation indicator to its ready setting in response to the motion-transmitting element completing a cycle of movement concomitant with the first available frame being positioned for exposure.

More particularly, the frame counter includes a counter disk having a series of peripheral teeth that are respectively engaged by the cooperating means of the motion-transmitting element to change the frame counter to a new numbered setting each time the next available frame is positioned for exposure. The cooperating means of the motion-transmitting element includes several teeth aligned with a like number of peripheral teeth of the counter disk that are respectively engaged by the cooperating means of the motion-transmitting element to change the film confirmation indicator to its ready setting as the frame counter is changed to its first numbered setting.

BRIEF DESCRIPTION OF THE DRAWINGS

The invention will be described in connection with the drawings, wherein:

FIGS. 3, 4 and 5 are top plan views of the various apparatus depicted in FIG. 2, serially depicting operation of the film initialization reassuring mechanism.

DETAILED DESCRIPTION OF THE PREFERRED EMBODIMENT

The invention is disclosed as being embodied preferably in a 35mm camera. Because the features of this type of camera are well known, the description which follows is directed in particular to photographic elements forming part of or cooperating directly with the disclosed embodiment. It is to be understood, however, that other elements not specifically shown or described may take various forms known to persons of ordinary skill in the art.

Figure 1:
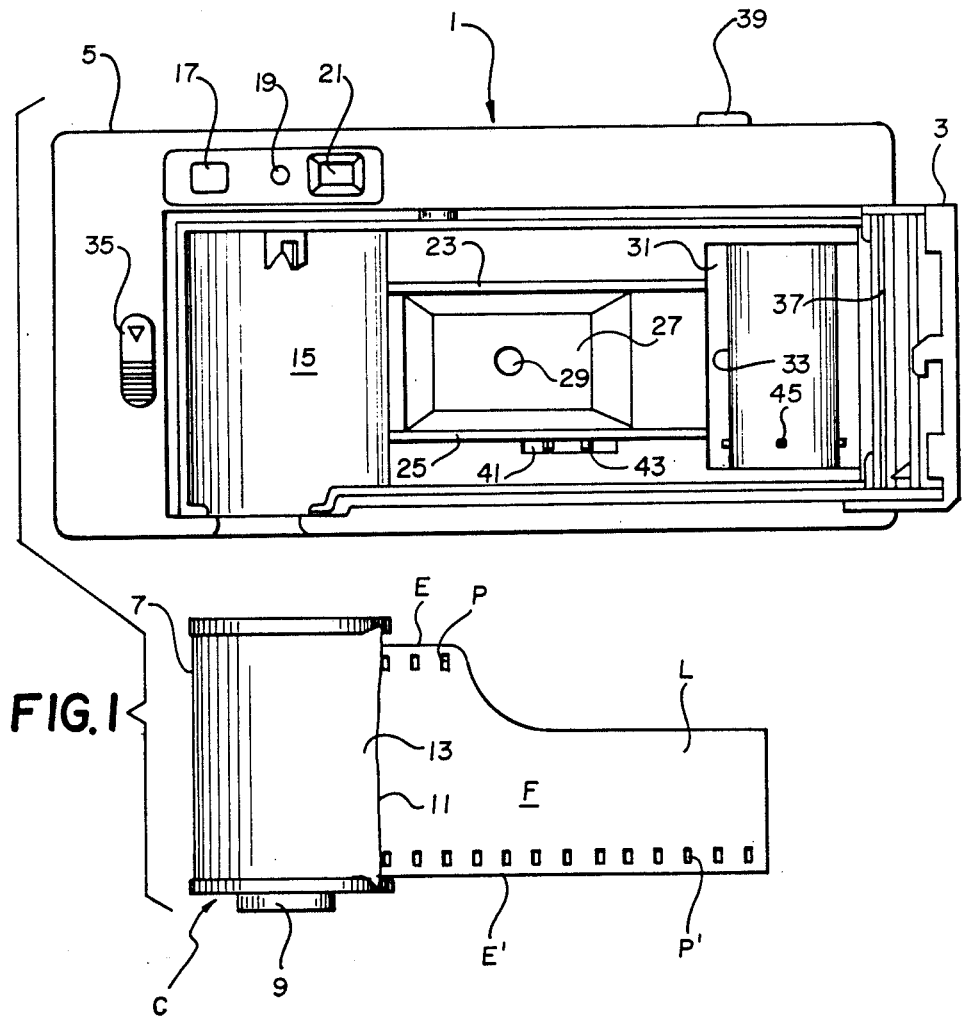
FIG. 1 is a rear elevation view of a camera and a 35mm film cartridge, showing a rear door of the camera opened.

Referring now to the drawings and in particular to FIG. 1, a 35mm camera 1 is shown with a rear door 3 pivotally mounted on a rear portion of the camera body 5. The door 3 is opened to receive a known film cartridge C, such as one manufactured by Eastman Kodak Company. The film cartridge C comprises a light-tight container 7 housing a rotatably supported spool 9 on which is wound an edge-perforated 35mm filmstrip F. The filmstrip F has an upper row of perforations P adjacent a longitudinal edge E and a lower row of operations P' adjacent a longitudinal edge E'. A leader section L of the filmstrip F projects from a plush-lined, light trapping slit 11 in a throat 13 of the cartridge C and has a forward end portion whose width is approximately one-half of the width of the remainder of the filmstrip. The 35mm camera includes a number of known elements, such as a loading chamber 15 for receiving the cartridge C; a flash ready lamp 17 for a built-in electronic flash, not shown; a low light warning lamp 19; a viewfinder window 21; a pair of substantially parallel film rails 23 and 25; a film exposure window 27; an objective lens 29;; a film take-up chamber 31 housing a film take-up spool 33 of drum; a manually operable latch 35 for securing the rear door 3 closed; a pressure plate 37 spring-supported on the inside of the rear door for holding successive frames on the filmstrip F flat on the pair of film rails 23 and 25 during film exposure at the exposure window 27; and a shutter release button 39 manually depressible to initiate film exposure.

To load the 35mm camera 1, the film cartridge C is inserted in the loading chamber 15. Then, an intermediate portion of the film leader L is placed over a metering sprocket 41 to position one or more of the perforations P in the leader in engagement with respective teeth 43 on the sprocket. In addition, the forward end portion of the leader L is placed over the take-up spool 33 to position one or more of the perforations P' in the leader in engagement with respective teeth 45 on the spool. An initial film winding operation is performed in a conventional manner by alternately pivoting a winding lever, not shown, and depressing the shutter release button three times to cause the take-up spool 33 to be rotated a like number of times. This advances the filmstrip F approximately three frame widths, which is sufficient to wind the film leader L onto the take-up spool 33 and to position the first available frame A of the filmstrip at the exposure window 27. See FIGS. 2 and 5.

Figure 2:
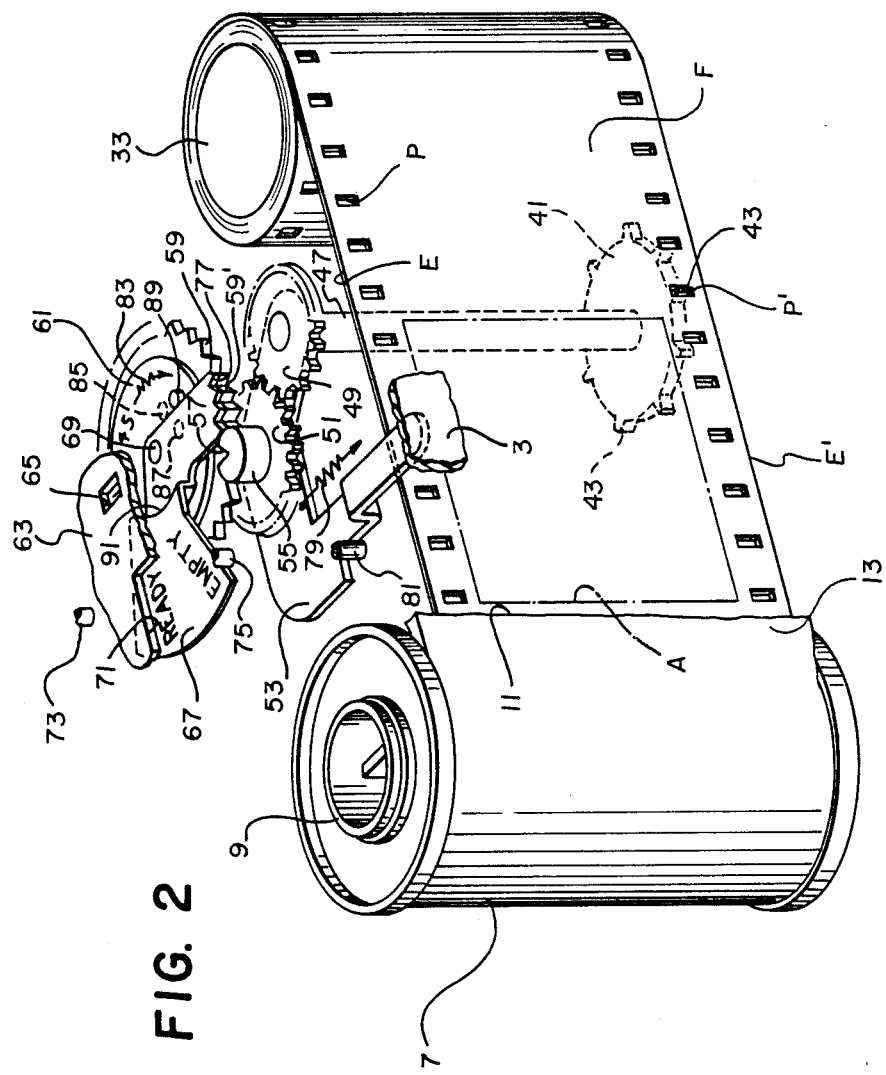
FIG. 2 is a rear perspective view of the film cartridge, a frame counter, and a film initialization reassuring mechanism in accordance with a preferred embodiment of the invention.

As shown in FIGS. 2 and 3, a coaxial shaft 47 connects the metering sprockt 41 and a metering gear 49 to enable the sprocket and the gear to rotate in unison. The metering gear 49 continuously engages a counter gear 51 which is rotatably mounted atop a swing plate 53. The swing plate 53 is supported on the shaft 47, immediately beneath the metering gear 49, for pivotal movement about the shaft without disengaging the counter gear 51 from the metering gear. A motion-transmitting stud 55 is coaxially fixed atop the counter gear 51 and has a single recess 57 for receiving successive peripheral teeth 59 of a rotatable counter disk 61 to thereby engage each tooth to rotate the disk in accordance with rotation of the counter gear.

Whenever the rear door 3 is closed, as shown in FIG. 4, it abuts against the swing plate 53 to maintain the motion-transmitting stud 55 in a position against at least one of the peripheral teeth 59 of the counter disk 61. The counter disk 61 is located beneath a top surface 63 of the camera body 5 and has thirty-six evenly spaced numbered settings represented by the numbers "1, 2, 3, 4, 5, . . . 36" imprinted on the disk. These numbers correspond to successive available frames of the filmstrip F. An original empty setting of the counter disk 23 is represented by the letter "E" imprinted on the disk. This is to indicate that the camera is empty. The original empty indication "E" is separated from the first frame number indication "1" by a series of two evenly spaced dot-like indications ".." imprinted on the disk. When the filmstrip F is initially wound onto the take-up spool 33 to position the first available frame A for exposure, the metering sprocket 41 is rotated by the winding movement of the filmstrip to increment the counter disk 61 three times via the motion-transmitting stud 55 to remove the indicator "E" from a frame indicator window 65 in the top surface 63 of the camera body 5 and to move the indicator "1" into the window. This is in conformity with the requirement that the filmstrip F must be advanced approximately three frame widths to position the first available frame A for exposure. Thereafter, each time the filmstrip F is advanced another frame width to position the next available frame for exposure, the metering sprocket 41 via the motion-transmitting stud 55 increments the counter disk 61 to a new numbered setting "2", etc.

Figure 5:
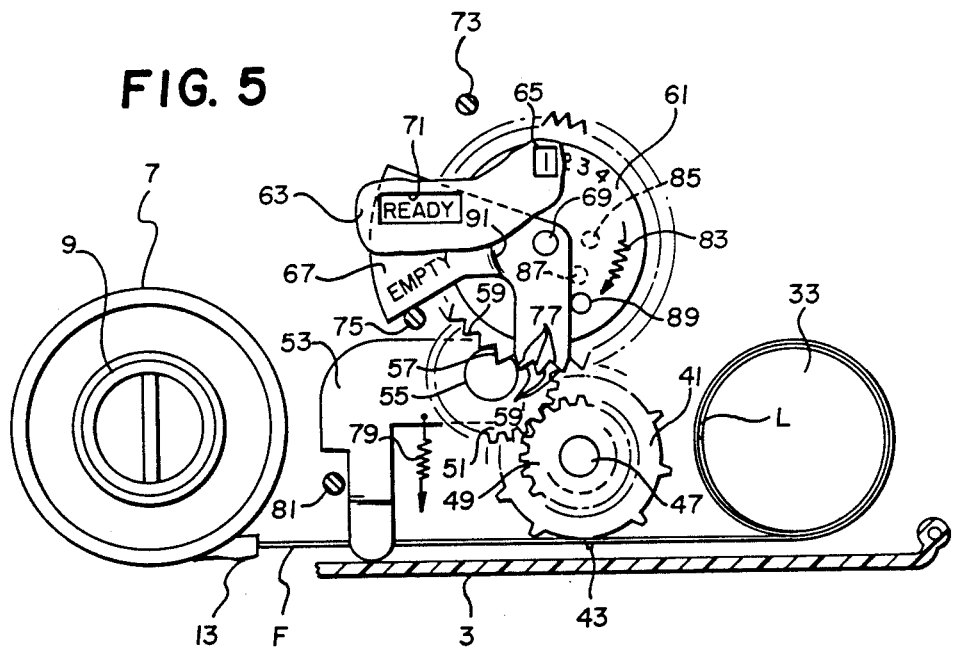

A film confirmation indicator 67 beneath the top surface 63 of the camera body 5 is mounted above the counter disk 61 for limited coaxial rotation with the disk about a common spindle 69. The confirmation indicator 61 has an original empty or not-ready setting in which the work "EMPTY" imprinted on the indicator 61 has an original empty 71 in the top surface 63, and in which the indicator abuts against a stop pin 73, as shown in FIGS. 3 and 4. In addition, the confirmation indicator 61 has an alternative ready setting in which the work "READY" imprinted on the indicator is positioned in the window 71, and in which the indicator abuts against a stop pin 75, as shown in FIGS. 2 and 5. As can be seen in FIGS. 4 and 5, the confirmation indicator 67 includes three successive teeth 77 aligned with the three teeth 59' of the counter disk 61 that are respectively engaged by the motion-transmitting stud 55 to increment the counter disk from its original empty setting "E" to its first numbered setting "1". Consequently, the three teeth 77 of the confirmation indicator 67 will be successively engaged by the motion-transmitting stud 55, when the respective teeth 59' of the counter disk 61 are similarly engaged, to change the confirmation indicator from its "EMPTY" setting to its "READY" setting as the counter disk is changed from its "E" setting to its "1" setting.

After all of the available frames of the filmstrip F have been exposed, the filmstrip as is known in the art is rewound into the cartridge C. At the same time, the counter disk 61 will be decremented to its original empty setting "E". When the three teeth 59' of the counter disk 61 are successive engaged by the motion-transmitting stud 55 to decrement the disk from its "1" setting to its "E" setting, the stud will similarly engage the respective teeth 77 of the film confirmation indicator 67 to change the indicator from its "READY" setting to its original "EMPTY" setting. See FIGS. 5 and 4.

If the rear door 3 is opened prematurely, i.e. before all of the exposed frames of the filmstrip F have been rewound into the cartridge C, a relatively heavy spring 79 will urge the swing plate 53 to pivot in a counter-clockwise direction about the shaft 47 into abutment against a stop pin 81. This causes two things to happen. First, the motion-transmitting stud 55 is moved out of its position against at least one of the peripheral teeth 59 of the counter disk 61 to release the disk. See FIG. 3. Then, a relatively light initializing spring 83 rotates the counter disk 61 to initialize the disk to its original empty setting "E". A fixed pin 85 on the underside of the counter disk 61 contacts a stop pin 87 to halt the disk at its setting "E". As the counter disk 61 is rotated to its setting "E", a reset pin 89 on the disk moves into abutment against the confirmation indicator 67, changing the indicator from its "READY" setting to its original "EMPTY" setting. An angled section 91 is provided in the confirmation indicator 67 to allow the reset pin 91 to pass under the indicator when the counter disk 61 is moved to a higher numbered setting from a lower numbered setting.

When the rear door 3 is re-closed, as shown in FIG. 4, it pivots the swing plate 53 in a clockwise direction about the shaft 47 away from the stop pin 81. As a result, the motion transmitting stud 57 is returned to its position shown in FIG. 4.

The invention has been described with reference to a preferred embodiment. However, it will be appreciated that variations and modifications of the invention can be effected by a person skilled in the art without departing from the scope of the invention. For example, the confirmation indicator 67 might have other indications instead of the indications "EMPTY" and "READY". All that is necessary is that the confirmation indicator 67 confirm that the first available frame A of the filmstrip F is positioned for exposure, when the counter disk 61 is in its first numbered setting "1".

I claim:

1. An improved photographic camera wherein (a) a frame counter is adapted to be changed to successive numbered settings corresponding to respective frames of a filmstrip, (b) a motion-transmitting element completes a cycle of movement each time the next available frame is positioned for exposure, to change said frame counter to a new numbered setting corresponding to that frame, and (c) a film confirmation indicator is changed to a ready setting substantially simultaneously with said motion-transmitting member changing said frame counter to a first numbered setting corresponding to the first available frame to be positioned for exposure, to provide a reassuring indication that said camera is ready to take a picture, and wherein the improvement comprises:
   said motion-transmitting element and said film confirmation indicator include respective cooperating means for changing the film confirmation indicator to its ready setting in response to the motion-transmitting element completing a cycle of movement concomitant with the first available frame being positioned for exposure.

2. The improvement as recited in claim 1, wherein said cooperating means of the motion-transmitting element is configured to drivingly engage said frame counter at least during most cycles of movement of said motion-transmitting element, to change the frame counter to a new numbered setting each time the next available frame is positioned for exposure, and to similarly engage said cooperating means of the film confirmation indicator only until it changes said indicator to the ready setting.

3. The improvement as recited in claim 2, wherein said frame counter and said film confirmation indicator are mounted for coaxial rotation to their respective settings.

4. The improvement as recited in claim 2, wherein said frame counter includes a counter disk having a series of peripheral teeth that are respectively engaged by said cooperating means of the motion-transmitting element to change the frame counter to a new numbered setting each time the next available frame is positioned for exposure, and said cooperating means of the film confirmation indicator includes several teeth aligned with a like number of said peripheral teeth of the counter disk that are respectively engaged by said cooperating means of the motion-transmitting element to change said film confirmation indicator to its ready setting as said frame counter is changed to its first numbered setting.

5. The improvement as recited in claim 2, wherein said motion-transmitting element is mounted to swing between an active position in which its cooperating means drivingly engages said frame counter and concurrently can drivingly engage said cooperating means of the film confirmation indicator and an idle position in which its cooperating means is disengaged from the frame counter and the cooperating means of said indicator, and said camera includes a rear door that is adapted to urge said motion-transmitting element to swing from its idle position to its active position in response to the closing of said rear door.

6. The improvement as recited in claim 1, further comprising:
   return means for changing said frame counter from any numbered setting to an original non-numbered setting before all of the available frames have been exposed; and
   said frame counter includes a reset member adapted to change said film confirmation indicator from its ready setting to an original not-ready setting concomitant with the frame counter being changed from any numbered setting to its original non-numbered setting, to provide a confirming indication that said camera is no longer prepared to take a picture.

7. An improved photographic camera wherein (a) a frame counter is adapted to be changed to successive numbered settings corresponding to respective frames of a filmstrip, (b) a motion-transmitting element changes said frame counter to a new numbered setting each time the next available frame is positioned for exposure, and (c) a film confirmation indicator is changed to a ready setting substantially simultaneously with said motion-transmitting member changing said frame counter to a first numbered setting corresponding to the first available frame to be positioned for exposure, to provide a reassuring indiction that said camera is ready to take a picture, and wherein the improvement comprises:
   said frame counter and film confirmation indicator are mounted for coaxial rotation to their respective settings; and
   said motion-transmitting element is adapted to engage said frame counter and said film confirmation indicator to substantially simultaneously rotate the frame counter to its first numbered setting and the film confirmation indicator to its ready setting concomitant with the first available frame being positioned for exposure.

8. An improved photographic camera wherein (a) a frame counter is adapted to be changed from an original non-numbered setting to successive numbered settings corresponding to respective frames of a filmstrip to be positioned for exposure and (b) a film confirmation indicator is adapted to be changed from an original not-ready setting to a ready setting substantially simultaneously with said frame counter being changed from its original non-numbered setting to a first numbered setting corresponding to the first available frame to be positioned for exposure, to provide a reassuring indication that said camera is ready to take a picture, and wherein the improvement comprises:

return means for changing said frame counter from any numbered setting to its original non-numbered setting before all of the available frames have been exposed; and said frame counter includes reset means for changing said film confirmation indicator from its ready setting to its original not-ready setting concomitant with the frame counter being changed from any numbered setting to its original non-numbered setting, to provide a confirming indication that said camera is no longer prepared to take a picture.

9. The improvement as recited in claim 8, wherein said frame counter and said film confirmation indicator are mounted for coaxial rotation to their respective settings, and said reset means projects from said frame counter to rotate said film confirmation indicator to its original non-numbered setting.

* * * * *

UNITED STATES PATENT AND TRADEMARK OFFICE
CERTIFICATE OF CORRECTION

PATENT NO. : 4,896,180
DATED : January 23, 1990
INVENTOR(S) : Joel S. Lawther

It is certified that error appears in the above-identified patent and that said Letters Patent is hereby corrected as shown below:

| | |
|---|---|
| Col. 1, line 43 | "operation" should read --operations-- |
| Col. 3, line 29 | "of" should read --or-- |
| Col. 4, line 38 | "work" should read --word-- |
| Col. 4, lines 38-39 | "61 has an original empty" should read --is positioned in a window-- |
| Col. 4, line 42 | "work" should read --word--. |

Signed and Sealed this

Second Day of April, 1991

Attest:

HARRY F. MANBECK, JR.

Attesting Officer

Commissioner of Patents and Trademarks